Figure 1:
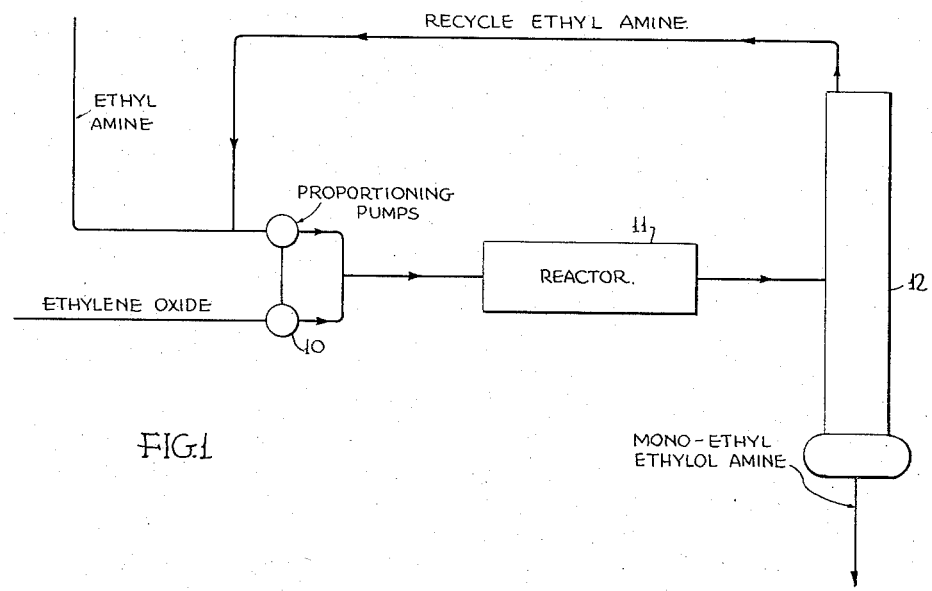

April 10, 1945.  E. J. SCHWOEGLER ET AL  2,373,199

MANUFACTURE OF HYDROXY ALKYL AMINES

Filed May 1, 1942

INVENTORS.
Edward J. Schwoegler
John F. Olin.
BY Maurice A. Crews
ATTORNEY

Patented Apr. 10, 1945

2,373,199

UNITED STATES PATENT OFFICE 2,373,199

MANUFACTURE OF HYDROXY ALKYL AMINES

Edward John Schwoegler, Wyandotte, and John Frank Olin, Grosse Ile, Mich., assignors to Sharples Chemicals Inc., Philadelphia, Pa., a corporation of Delaware Application May 1, 1942, Serial No. 441,260

6 Claims. (Cl. 260—584)

The present invention pertains to the manufacture of compounds which may be regarded as derivatives of ammonia having at least one alkylol radical substituted for a hydrogen atom of ammonia, and which may also have one or two alkyl radicals substituted for other hydrogen atoms of the ammonia molecule. A primary purpose of the invention has been to provide a satisfactory method of producing compounds of this type by a process in which the reaction mixture is substantially free of water.

It is a well known fact that aqueous solutions of ammonia may be condensed with alkylene oxides to produce alkylol amines, this process having been described by Wurtz in 1860 (Liebig's Annalen der Chemie, vol. 114, pages 51 to 54). Similar processes in which aqueous solutions of aliphatic amines are condensed with alkylene oxides are also well known (see German Patent 97,102 of March 30, 1897, and pages 61 and 62 of Bodforss' work on "Die Aethylenoxyde").

In the manufacture of the simple alkylol amines in accordance with the Wurtz process and also in the manufacture of the alkyl-substituted alkylol amines by the same general technique, these products have been manufactured by processes involving presence of very substantial quantities of water in the reaction mixture. Bodforss refers to the fact that violent explosions occur even when concentrated ammonia liquid is used, and states that pure ethylene oxide does not react with carefully dried ammonia gas. Prof. Frank C. Whitmore, of Pennsylvania State College, in his work on Organic Chemistry (Van Nostrand Co., 1937) makes the statement (page 373) that: "Diethyl amine and ethylene oxide do not unite dry." Kautter in U. S. Patent 2,051,486, indicates that the reaction between alkylene oxides and dry ammonia is very slow "at temperatures at which the reactants and reaction products are substantially stable." (Page 1, column 2, lines 3 to 6.)

Horne and Shriner, in an article at vol. 54, page 2925 (July, 1932) of the Journal of the American Chemical Society, indicate that diethyl amine will not react with ethylene oxide except in the presence of water or alcohol. Headlee, in an article at vol. 55, page 1066 (March, 1933) of the Journal of the American Chemical Society, indicates that Horne and Shriner were in error in concluding that it was necessary to add water to cause diethyl amine to condense with ethylene oxide, but the experiment which Headlee described was on a very small scale (in a 500 milliliter autoclave), and the temperature was maintained at 100° C. Attempts to conduct such a reaction on a larger scale have resulted in slow initial reaction followed by subsequent reaction with rapid temperature rise and an increase in pressure of a very dangerous degree.

As a result of the above-discussed limitations in prior art procedure, methods of making alkylol amines by condensation of ammonia or alkyl amines with alkylene oxides have ordinarily been conducted by condensing alkylene oxides with aqueous amine or ammonia solutions containing very substantial proportions of water. As a consequence of this fact, it has been necessary to conduct a special, and sometimes difficult, step of dehydration of the resulting reaction mixture in order to separate water from the finished product. In the case of diethyl amino ethanol, dipropyl amino ethanol, dibutyl amino ethanol, and the corresponding dialkyl amino propanols and butanols, considerable difficulty is encountered in the dehydration step because of the fact that these amines form constant boiling mixtures with water.

In contrast to prior art processes, the present invention provides a method of condensing ammonia, or mono- or di-alkyl amines, with alkylene oxides without the necessity of having water present to promote, or to assist in control of, the reaction.

In the practice of the present invention, the aliphatic amine or ammonia is continuously passed, together with the alkylene oxide to be condensed therewith to form the desired alkylol amine, through a reaction chamber maintained, at the most highly heated part of the chamber, at a temperature between 120 and 275° C. The quantity of amine to be condensed with the ethylene oxide is maintained, in the flowing stream, in considerable molecular excess of the amount of alkylene oxide present. By the use of this last-mentioned feature, two advantageous results are attained. In the first place, by limiting the amount of alkylene oxide present, the exothermic heat of reaction is correspondingly limited. In the second place, the excess of amine or ammonia passed through the reaction chamber tends to absorb a large part of the heat of reaction, acting as a diluent to prevent development of destructively high temperatures and pressures.

In the preferred form of the invention, reactants which do not enter into the desired condensation reaction during a given pass through the apparatus are recycled. If an excessive amount of alkylene oxide is recycled, reaction during the pass in which this recycling occurs may be so violent as to rupture the apparatus or cause formation of undesired by-products by development of excessive heat. The use of an excess of the amine serves, in accordance with the laws of mass action, to promote the desired reaction and cause utilization of the alkylene oxide introduced during each pass, thereby minimizing or avoiding the necessity for recycling of this reactant. Thus, by causing the alkylene oxide to be used up substantially as fast as it is introduced, the process may be run in such a manner as to maintain a substantial stoichiometric excess of the ammonia or amine at all stages of the process, with the result that the temperature, pressure and reaction may be controlled.

On the attached flow sheet, the invention is illustrated in its application to the method of manufacture of mono-ethyl ethylol amine, with the understanding that the same principles may be applied in manufacture of mono-, di-, or tri-alkylol amines in general by condensation of alkylene oxides with ammonia or mono-alkylol or di-alkylol amines, respectively, or to condensation of any alkyl or dialkyl amine or mono-alkyl, mono-alkylol amine with an alkylene oxide. In general, however, the invention has principal utility in condensation of ammonia or mono- or di-alkyl amines containing between 1 and 8 carbon atoms in the alkyl radical or total of alkyl radicals, with alkylene oxides containing between 2 and 4 carbon atoms. As examples of the scope of the materials which may be treated in the practice of the invention, it includes condensation of alkylene oxides with ammonia, mono-ethylol and di-ethylol amines, with mono-methyl or di-methyl amines or mono-methyl, mono-alkylol amines, and with corresponding mono- or di-alkyl amines containing between 2 and 8 carbon atoms, and with mono-alkyl, mono-alkylol amines containing between 2 and 8 carbon atoms in the sum of the alkyl and alkylol radicals.

In the flow sheet, Figure 1 illustrates a method of condensing ethylene oxide with ethyl amine by a continuous process which may be similarly applied in the other condensation reactions between alkylene oxides and ammonia or amines discussed above, and Figure 2 illustrates an alternative form of the invention.

Referring to Figure 1 of the drawing, ethyl amine and ethylene oxide are pumped into confluence with each other in proportions preferably involving a large molecular excess of ethyl amine over ethylene oxide (e. g., at least 7:3), this pumping and proportioning being accomplished by pumps 10 which are interconnected to provide constant predetermined ratios of the amine and ethylene oxide. The two streams are brought together and passed continuously through a reaction chamber 11 which is heated to a temperature substantially above the minimum temperature of condensation between the ethyl amine and ethylene oxide, but below the decomposition temperature of the desired mono-ethyl, mono-ethylol amine. The temperature will be higher toward the center of the reactor 11 than at the entrance end, and should be maintained between 120° C. and 275° C., regardless of the particular amine to be condensed with the particular alkylene oxide, if the reaction is conducted under anhydrous conditions. In general, the maximum temperature, and the temperature through the major part of the passage through the reactor should be between 130° C. and 200° C., for best results.

By providing a large excess of ethyl amine, two advantages are attained. In the first place, the formation of mono-alkyl, di-alkylol amine is minimized, since a quantity of ethylene oxide is provided which is inadequate to convert all of the mono-ethyl amine to the mono-ethylol derivative. But a more important aspect of the control of the ratio between the ethylene oxide and the ethyl amine consists in the fact that this control permits control of the temperature in the reactor 11 to maintain it within the limits discussed above, thereby assisting the prevention of the formation of the undesired di-alkylol derivative, and at the same time preventing formation of other undesired by-products. The mixture from the reactor 11 is passed to a fractionating column 12 in which the unreacted ethyl amine is passed overhead and the mono-ethyl, ethylol amine collected as a residue. The unreacted ethyl amine obtained from this distillation operation may be recycled by passing it, together with fresh ethyl amine to the reactor, as illustrated in the drawing.

Figure 2:
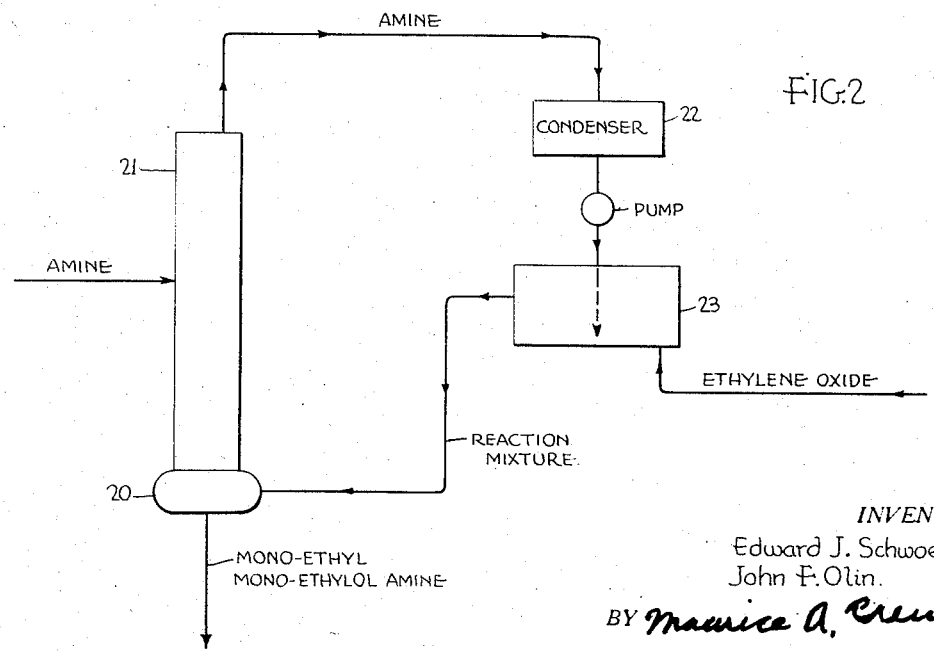

Figure 2 of the drawing illustrates a modification in which ethyl amine from the still pot 20 is boiled to cause passage of the amine overhead through the column 21, after which it is condensed in condenser 22 and pumped into a reactor 23. The reactor 23 may be a container of relatively small capacity into which ethylene oxide is also continuously passed in the molecular ratio of not greater than 3:7 to the amine passed to the container 23. The container 23 will be maintained under super-atmospheric pressure sufficient to maintain the ethylene oxide and amine in the liquid phase, and the reaction mixture will be withdrawn from an upper portion of the container 23 and continuously returned to the still pot 20. Mono-ethyl, ethylol amine formed by the condensation reaction, being higher boiling than the ethyl amine, will remain in the still pot 20, while unreacted ethyl amine returned to the still pot will be passed overhead during the continued course of the reaction; this unreacted amine being passed cyclically through the apparatus until the body of liquid in the still pot 20 consists substantially entirely of the desired mono-ethyl, mono-ethylol amine. Fresh amine to be condensed with the ethylene oxide may be passed to the column 21 from time to time, and the reaction product may be withdrawn from the still pot 20, as illustrated in the flow sheet. The temperature conditions to be observed in the embodiment of Figure 2 are similar to those involved in practice of the embodiment of Figure 1 and discussed in connection with the discussion of that figure.

While the temperature which should be maintained at the most heated part of the reactor 11 will vary with the individual amine or ammonia being condensed with the alkylene oxide, this temperature should be maintained between 120 and 275° C. for the class of amines discussed above. In general, higher temperatures are desirable for condensation of amines of higher carbon content than for amines of lower carbon content.

*Example I*

A stainless steel reaction apparatus capable of withstanding pressures up to 1000 pounds per square inch is assembled in the manner illustrated in Figure 2 of the drawing. The equipment consists of a 50 gallon kettle to which is attached a four inch column ten feet in height. The column is provided with an inlet tube four feet from the top through which mono-ethyl amine is pumped to the column. The temperature of the kettle is maintained at such a point as to cause the mono-ethyl amine to vaporize and pass overhead. This temperature is not constant due to increasing amounts of product collecting in the kettle. The vaporized amine is condensed and pumped to a reactor which is heated to 150° C. The pressure at this point is 485 pounds per square inch. Ethylene oxide is then pumped into the reactor so that the ratio of amine to ethylene oxide is 6:1. The excess ethylamine and reaction products pass into the kettle, where the mono-ethyl amine is vaporized and recycled. The products are continually removed from the kettle. A fractionation of a sample shows a 78.3% conversion to mono-ethyl amino ethanol and a 19.6% conversion to mono-ethyl diethylol amine.

*Example II*

In equipment as illustrated in Figure 1, and capable of withstanding a pressure of 2000 pounds per square inch, ammonia and ethylene oxide are pumped to a reaction chamber heated to 130° C. in a ratio of ammonia to ethylene oxide of 15:1. The pressure at this temperature is 1600 pounds per square inch. The products pass to the center of a distilling column four inches in diameter and ten feet high. The mono-ethylol amine, diethylol amine and tri-ethylol amine are removed at the bottom, while the unreacted ammonia is recycled and reacted further with more ethylene oxide. An analysis of the product shows that the alkylol amines are present to the extent of 78.3% mono-ethylol amine, 16% di-ethylol amine and 4.4% tri-ethylol amine.

Various modifications are possible within the scope of the invention, and we do not therefore wish to be limited except by the scope of the following claims.

We claim:

1. In the manufacture of alkylol amines, the process comprising continuously passing an alkylene oxide having from two to four carbon atoms into confluence with a molecular excess of a compound having the formula

in which R and R' are chosen from the class consisting of hydrogen and alkyl and alkylol radicals having from one to four carbon atoms, and subjecting the resulting mixture during continuous flow under substantially anhydrous conditions to a temperature between 120 and 275° C. to effect the desired condensation between said alkylene oxide and said compound, a molecular excess of said compound with respect to said alkylene oxide being maintained at all times when the reaction mixture is between 120 and 275° C.

2. In the manufacture of mono-alkyl, mono-alkylol amines, the process comprising continuously passing an alkylene oxide having from two to four carbon atoms into confluence with a molecular excess of at least 7:3 of an alkyl amine having at least one unsubstituted hydrogen atom and having not over four carbon atoms in any single alkyl radical, subjecting the resulting mixture under substantially anhydrous conditions to a temperature between 120 and 275° C. during the continuous flow of the mixture, and separating unreacted alkyl amine from the resulting condensation product by distillation, a molecular excess of amine to alkylene oxide of at least 7:3 being maintained at all times at which the temperature is as high as 120° C.

3. In the manufacture of mono-alkyl, mono-alkylol amines, the process comprising continuously passing an alkylene oxide having from two to four carbon atoms into confluence with a molecular excess of at least 7:3 of an alkyl amine having at least one unsubstituted hydrogen atom and having not over four carbon atoms in any single alkyl radical, subjecting the resulting mixture under substantially anhydrous conditions to a temperature between 130 and 200° C. during the continuous flow of the mixture, and separating unreacted alkyl amine from the resulting condensation product by distillation, a molecular excess of amine to alkylene oxide of at least 7:3 being maintained at all times at which the temperature is as high as 130° C.

4. In the manufacture of mono-alkyl, mono-alkylol amines, the process comprising continuously passing an alkylene oxide having from two to four carbon atoms into confluence with a molecular excess of at least 7:3 of a mono-alkyl amine having from one to four carbon atoms, subjecting the resulting mixture to a temperature between 120 and 275° C. during the continuous flow of the mixture, passing the resulting reaction mixture to a still to effect separation of unreacted alkyl amine from the resulting condensation product, distilling said unreacted alkyl amine overhead while retaining the mono-alkyl, mono-alkylol amine as a residue of the distillation, passing the overhead distillate consisting of unreacted alkyl amine into confluence with a further quantity of the alkylene oxide in a repetition of the reaction step of the process, and returning the reaction mixture of said last-mentioned reaction step to the still and effecting distillation of the alkyl amine of said reaction mixture overhead while continuing the accumulation of mono-alkyl, mono-alkylol amine in the still, a molecular excess of amine to alkylene oxide of at least 7:3 being maintained at all times at which the temperature is as high as 120° C.

5. In the manufacture of mono-alkyl, mono-alkylol amines, the process comprising continuously passing an alkylene oxide containing between two and four carbon atoms into confluence with a molecular excess of at least 7:3 of an alkyl amine containing between one and four carbon atoms, subjecting the resulting mixture under substantially anhydrous conditions to a temperature between 120 and 275° C. during the continuous flow of the mixture, and separating unreacted alkyl amine from the resulting condensation product by distillation, a molecular excess of amine to alkylene oxide of at least 7:3 being maintained at all times at which the temperature is as high as 120° C.

6. In the manufacture of mono-ethyl, mono-ethylol amine, the process comprising continuously passing ethylene oxide into confluence with a molecular excess of at least 7:3 of ethyl amine, subjecting the resulting mixture to a temperature between 120 and 275° C. during the continuous flow of the mixture, and separating unreacted ethyl amine from the resulting condensation product by distillation, a molecular excess of amine to alkylene oxide of at least 7:3 being maintained at all times at which the temperature is as high as 120° C.

EDWARD JOHN SCHWOEGLER.
JOHN FRANK OLIN.